Patented Oct. 20, 1942

2,299,189

UNITED STATES PATENT OFFICE 2,299,189

VINYL ETHER

Donald R. Swan, Rochester, N. Y., assignor to Eastman Kodak Company, Rochester, N. Y., a corporation of New Jersey No Drawing. Application October 31, 1939, Serial No. 302,203

10 Claims. (Cl. 260—90)

This invention relates to vinyl ethers and to a process for the preparation thereof.

Vinyl ethers have been prepared by treating acetylene with alcohols, in the presence of a suitable catalyst. Vinyl ethers have also been prepared by decomposing acetals, in the vapor phase, over suitable catalysts. Vinyl ethers have also been prepared by treating vinyl halides with alcoholates, such as sodium alcoholate. However, none of these processes suffices to prepare a vinyl ether of the type of vinyl methyl formal, which is a mixed acetal of formaldehyde and has the following formula:

$$CH_2=CH-O-CH_2-O-CH_3$$

It is, accordingly, an object of my invention to provide vinyl ethers of the kind of vinyl methyl formal. A further object is to provide a process for preparing such vinyl ethers. A further object is to provide polymerization products from such vinyl ethers. Other objects will become apparent hereinafter.

According to my invention, I prepare vinyl ethers of the type of vinyl methyl formal, i. e. vinyl ethers which can be represented by the following general formula:

$$CH_2=CH-O-CH_2-O-R$$

wherein R represents an alkyl group, by distilling a β-halogeno-ethyl alkyl formal of the following general formula:

$$X-CH_2-CH_2-O-CH_2-O-R$$

wherein X represents a halogen atom and R represents an alkyl group, in contact with a fused (i. e. anhydrous) alkali metal hydroxide.

I have found that β-bromoethyl alkyl formals are advantageously employed and that fused potassium hydroxide is advantageously used.

The following example will serve to demonstrate the manner of practicing my invention. This example is not intended to limit my invention.

EXAMPLE 1.—*Vinyl methyl formal*

445 g. (2.6 mol.) of β-bromoethyl methyl formal was mixed with 450 g. (8 mol.) of fused potassium hydroxide suspended in 300 cc. of mineral oil (of boiling point between 350° C. and 400° C.). The mixture was then placed in a still fitted with a stirrer. While stirring, the mixture was heated until distillation took place at a moderate rate. Distillation at a moderate rate was continued until 114 grams of distillate were collected. The 114 grams of distillate were then fractionally distilled and the fraction (85 grams) boiling at 68° C. (760 mm. of mercury pressure) was separated. It was a nearly colorless liquid.

In a similar manner, vinyl ethyl formal can be prepared from β-bromoethyl ethyl formal, vinyl propyl formal from β-bromoethyl propyl formal and vinyl butyl formal from β-bromoethyl butyl formal. Vinyl ethyl formal, vinyl propyl formal and vinyl butyl formal are each nearly colorless liquids of higher boiling point than vinyl methyl formal.

Instead of fused potassium hydroxide in the foregoing example, fused sodium hydroxide or other anhydrous alkali metal hydroxides can be used.

The mineral oil in the foregoing example is employed as a diluent and may be dispensed with entirely. However, without a diluent, lower yields are usually obtained.

The β-bromoethyl methyl formal employed in the above example was prepared according to the following example.

EXAMPLE 2.—*β-Bromoethyl methyl formal*

4 parts of ethylene bromohydrin, 1 part of anhydrous methyl alcohol, 1 part of trioxymethylene and ⅔ part of anhydrous calcium chloride were mixed together and the mixture was heated at the temperature of a steam bath, under reflux, for about four hours. The liquid portion of the reaction mixture was then decanted and washed twice with water, then with N/2 aqueous sodium hydroxide solution, then with a 5% (by weight) aqueous solution of sodium bisulfite and finally with N/2 aqueous sodium hydroxide. The so treated liquid was then dried over "Drierite" and finally fractionally distilled under reduced pressure. The fraction boiling at 46.5 to 47° C. at 5 mm. of mercury pressure was β-bromoethyl methyl formal.

Vinyl ethers of the kind of vinyl methyl formal can be polymerized, employing catalysts to hasten the polymerization. Catalysts such as aluminum chloride, stannous chloride or boron trifluoride are especially suitable. Vinyl ethers of the kind of vinyl methyl formal form copolymers with maleic anhydride. The following example is illustrative of the formation of such a copolymer.

EXAMPLE 3.—*Copolymer of vinyl methyl formal and maleic anhydride*

To a mixture of 6 g. of vinyl methyl formal and 6 g. of maleic anhydride were added a small amount (about 0.1% by weight of the mixture)

of benzoyl peroxide. The mixture was heated at 70° to 80° C. under reflux. After a short period of heating, a vigorous polymerization took place, and the mixture became a thick viscous liquid. Further heating caused only a small change in appearance, although after 24 hours of heating the reaction mass became a solid plastic mass upon cooling. The reaction mass was dissolved in 2 to 3 times its volume of acetone and the acetone solution poured into water to precipitate the copolymer. The copolymer precipitated as a white, fibrous material which was dried at room temperature. It dissolved in ethanol, acetone and pyridine, but did not dissolve in benzene, ethyl acetate or ethylene dichloride. Water slowly alters the product, probably owing to hydrolysis of the anhydride groups in the copolymer.

What I claim as my invention and desire to be secured by Letters Patent of the United States is:

1. A vinyl ether having the following formula:

$$CH_2=CH-O-CH_2-O-R$$

wherein R represents an alkyl group.

2. A vinyl ether having the following formula:

$$CH_2=CH-O-CH_2-O-R$$

wherein R represents an alkyl group of the formula $C_nH_{2n+1}$ wherein $n$ represents a positive integer of from one to four.

3. A vinyl ether having the following formula:

$$CH_2=CH-O-CH_2-O-CH_3$$

4. A polymer of a vinyl ether having the following formula:

$$CH_2=CH-O-CH_2-O-R$$

wherein R represents an alkyl group.

5. A polymer of a vinyl ether having the following formula:

$$CH_2=CH-O-CH_2-O-R$$

wherein R represents an alkyl group of the formula $C_nH_{2n+1}$ wherein $n$ represents a positive integer of from one to four.

6. A polymer of a vinyl ether having the following formula:

$$CH_2=CH-O-CH_2-O-CH_3$$

7. A process for preparing a vinyl ether comprising distilling, in contact with fused alkali metal hydroxide, a compound having the following formula:

$$X-CH_2-CH_2-O-CH_2-O-R$$

wherein R represents an alkyl group and X represents a halogen atom.

8. A process for preparing a vinyl ether comprising distilling, in contact with fused alkali metal hydroxide, a compound having the following formula:

$$Br-CH_2-CH_2-O-CH_2-O-R$$

wherein R represents an alkyl group of the formula $C_nH_{2n+1}$ wherein $n$ represents a positive integer of from one to four.

9. A process for preparing a vinyl ether comprising distilling, in contact with fused potassium hydroxide, a compound of the following formula:

$$Br-CH_2-CH_2-O-CH_2-O-R$$

wherein R represents an alkyl group of the formula $C_nH_{2n+1}$ wherein $n$ represents a positive integer of from one to four.

10. A process for preparing a vinyl ether comprising heating, in contact with fused potassium hydroxide, a compound of the following formula:

$$Br-CH_2-CH_2-O-CH_2-O-CH_3$$

DONALD R. SWAN.